T. J. Corning,

Hay Press.

No. 112,224.  Patented Feb. 28, 1871.

Witnesses
E. Patten
D. F. Hughes

Inventor
Thomas J. Corning
By C. W. M. Smith his atty

United States Patent Office.

THOMAS J. CORNING, OF SAN JOSÉ, CALIFORNIA.

Letters Patent No. 112,224, dated February 28, 1871.

IMPROVEMENT IN BALING-PRESSES.

The Schedule referred to in these Letters Patent and making part of the same.

*To all whom it may concern:*

Be it known that I, THOMAS J. CORNING, of San José, in the county of Santa Clara and State of California, have invented an Improved Baling-Press; and I do hereby declare that the following is a full and exact description of the same, reference being had to the accompanying drawing and to the letters of reference marked thereon.

This invention relates to a horizontal press having double baling compartments; and consists, mainly, in operating the two followers in a rectilinear manner by means of a toothed rack that works in corresponding teeth on a segmental wheel, moved on a transverse shaft by means of a crank-lever, so that, when a bale is formed in one end of the press, and the cords to hold it are being tied, the pitchers can fill the opposite compartment, and thereby but little delay is experienced in operating the followers, as will be fully described hereinafter.

In the drawing—

To enable others skilled in the art to which my invention appertains to make and use the same, I will now proceed to fully describe my improved press, with the method of operating the same.

It is a well-known fact that much time is consumed in baling hay and other fibrous material with the ordinary presses, for the reason that a great deal of tramping is required in order to get the hay sufficiently compact before the follower is brought to bear upon it, and that the pitchers are oftentimes idle while the bale is being compressed, tied, and removed from the machine; but, in the employment of my improved press, it is believed that hay can be baled much faster and be presented in the market in a much better condition than when baled by machines of the ordinary construction.

Figure 1:
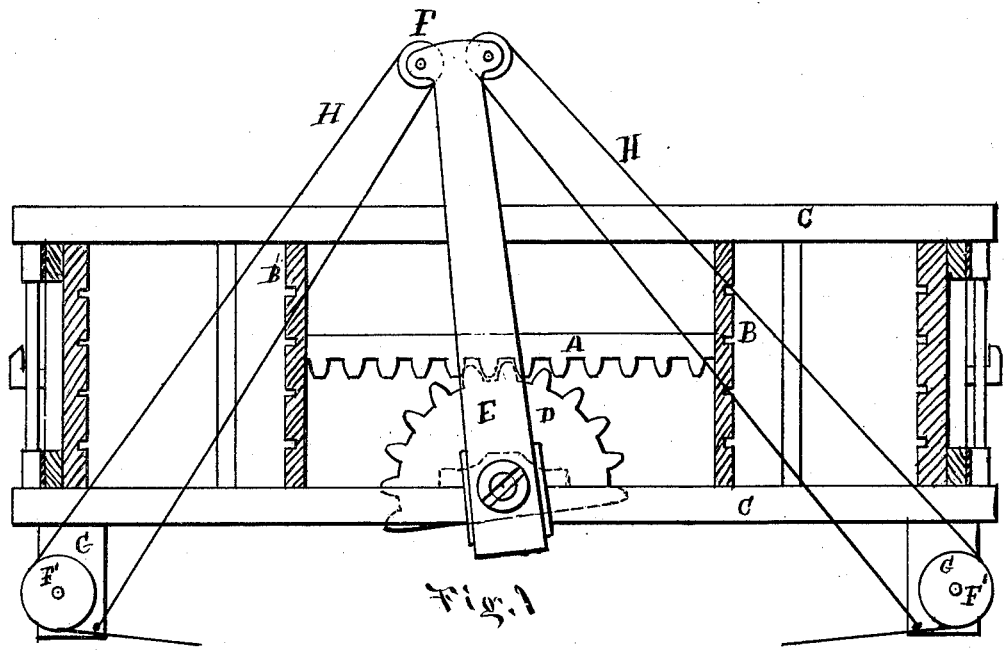
Figure 1 is in part an elevation, and in part a vertical section, of a press embodying my invention.
Figure 2:
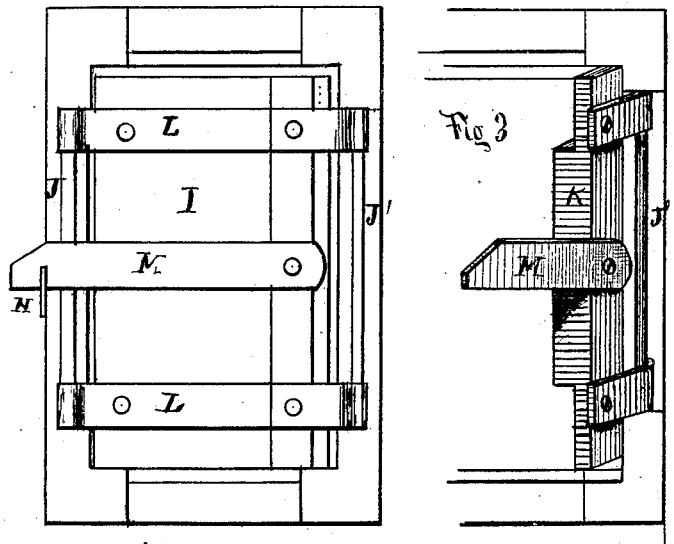
Figure 2 is a view of the end, showing the door closed.
Figure 3:
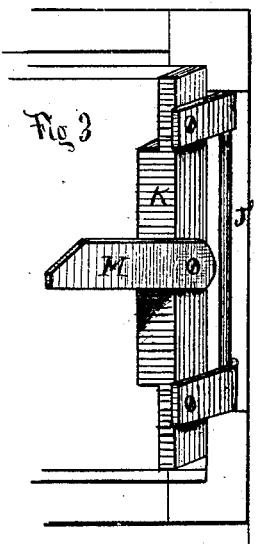
Figure 3 shows a portion of the door partially opened.

In fig. 1 A is a toothed rack, to each end of which is rigidly attached a follower, B, which causes the follower to move back and forth in the ways of the frame C, in a true rectilinear manner, by means of the teeth on the segmented wheel D engaging the teeth on the rack.

A transverse shaft passes through the wheel, having its bearings on the frame of the press, and a sufficient length of end to attach a crank-bar or arm, E, which operates the segmental wheel in a manner which will be hereinafter more fully described.

To the end of the crank-bar I attach friction-pulleys F, and corresponding pulleys F' are connected to the foundation or bed-pieces G, at each end of the frame.

Ropes H H pass around each of these series of pulleys, with one end disengaged, to apply or connect the power to drive the followers.

It should here be observed that the door I employ, by its peculiar construction, is of considerable importance in this class of presses where so great resistance is required to withstand the pressure obtained by such a powerful leverage employed to drive the followers; and, for this purpose, the door I is hinged to the frame by a vertical rod, J. This door fills the space or entrance proper to the baling-chamber, and opens outwardly, as shown, and, when closed, shuts in sufficiently far toward the baling-chamber to admit the folding against its side of a vertical bar, K, which is hinged to the opposite side of the frame by a rod, J', in a similar manner to that of the door proper.

Each end of the vertical bar is scarfed, and forms a scarf-joint with the cross-bars L of the said door proper.

A heavy latch or bar, M, is attached to the face of the vertical bar about midway, which engages a catch, N, attached to the opposite post of the frame.

In operating with my press it will be seen that the greatest amount of baling space is obtained in each chamber when the lever E is perpendicular.

In practice, however, it is usual to fill one chamber while the contents of the other are being compressed, and under such circumstances the greatest baling space will be obtained when the lever is nearest the pulley opposite the open chamber.

The material to be baled is thrust in by the pitcher until the chamber to be operated is sufficiently filled to make a bale of the desired size and weight, when the horse or other power is applied to the rope, which passes around the pulley at the side of the machine nearest the chamber operated, which causes the lever to approach the pulley, drawing the follower and material to be baled toward the door, and while the ropes are being tied around the bale in this chamber from the outside of the machine the opposite chamber is filled, and the lever raised, and power applied or transferred to the opposite rope and pulley, in the same manner and with similar result, as before described.

It may not be inappropriate here to remark that hay baled with this press will come from the bale in a much better condition than that baled by other presses, for the reason that the locks are put in the press and drawn together flatwise, and the fibers are not crushed, doubled, and broken, as when baling with an upright press; consequently, when cut, the flakes can be removed easily and without pulling any considerable part of the bale to pieces.

If it should be found necessary, a friction-wheel might be placed at the top of the horizontal rack, with its bearings on the frame, to impart more strength and facilitate the operation of the machine.

Having thus described my invention,

What I claim, and desire to secure by Letters Patent, is—

In a double-acting horizontal baling-press, having two chambers and followers B B', the combination of the rack A, segmented toothed wheel D, and lever E, operated by power applied to the ropes H H, which pass over the pulleys F F', substantially in the manner and for the purpose described.

In witness whereof I have hereunto set my hand and seal.

THOMAS J. CORNING. [L. S.]

Witnesses:
C. W. M. SMITH,
H. S. TIBBEY.